J. E. GAGNON.
COMBINED CHURN AND BUTTER WORKER.
APPLICATION FILED DEC. 12, 1914.
1,205,188.
Patented Nov. 21, 1916.
2 SHEETS—SHEET 1.
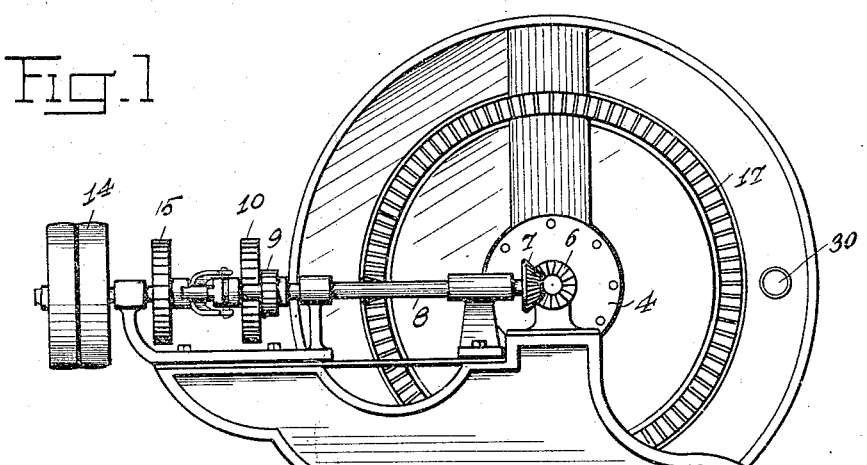
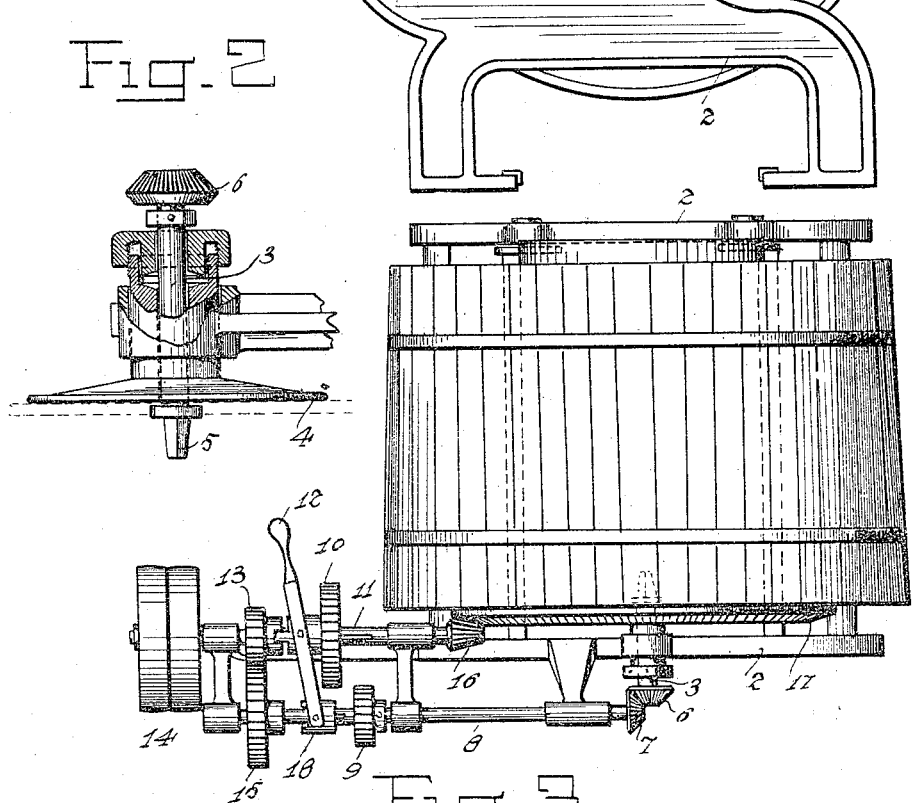

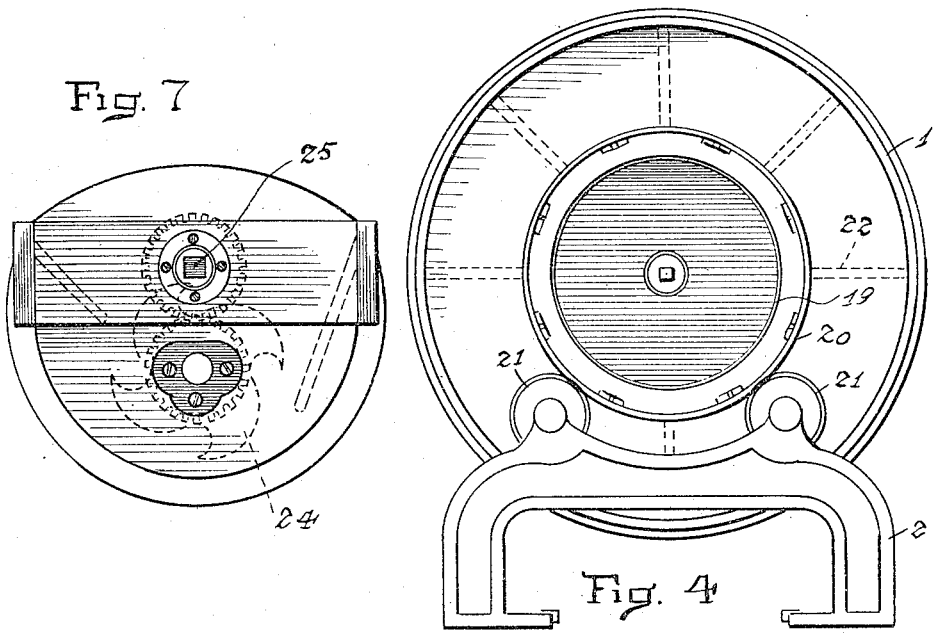
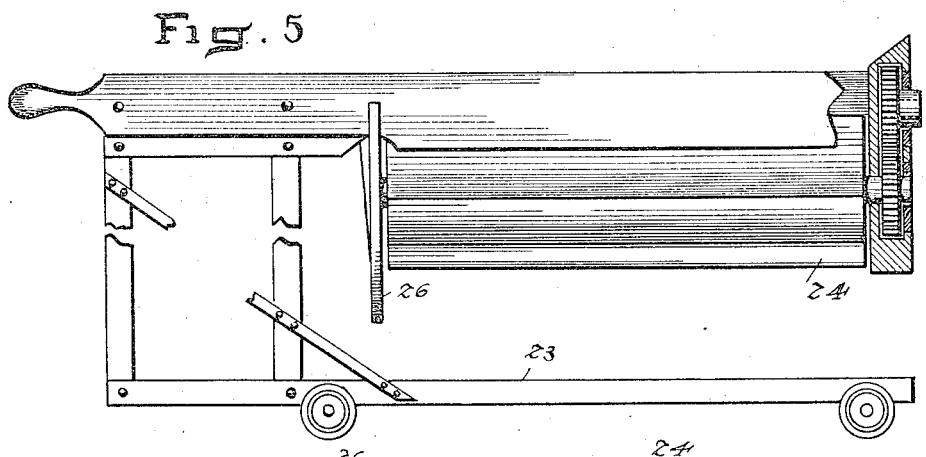
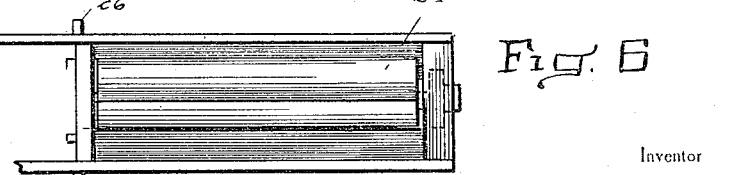

UNITED STATES PATENT OFFICE.

JOSEPH ERNEST GAGNON, OF VICTORIAVILLE, QUEBEC, CANADA.

COMBINED CHURN AND BUTTER-WORKER.

1,205,188.  Specification of Letters Patent.  Patented Nov. 21, 1916.

Application filed December 12, 1914. Serial No. 876,813.

*To all whom it may concern:*

Be it known that I, JOSEPH ERNEST GAGNON, a subject of the King of Great Britain, residing at Victoriaville, Province of Quebec, Canada, have invented certain new and useful Improvements in Combined Churns and Butter-Workers; and I do hereby declare that the following is a full, clear, and exact description of the invention, such as will enable others skilled in the art to which it appertains to make and use the same.

The invention to be hereinafter described relates to combined churns and butter workers.

In order to more clearly disclose the construction, operation, and use of the invention, reference should be had to the accompanying drawings forming part of the present application.

Throughout the several figures of the drawings like reference characters designate the same parts.

In the drawings: Figure 1 is a rear view of the churn; Fig. 2 is a detail of the means for driving the butter working apparatus; Fig. 3 is a top plan view of the churn; Fig. 4 is a front view of the churn; Fig. 5 is a side elevation of the butter working apparatus; Fig. 6 is a plan view of the same; and Fig. 7 is a rear view of the butter working apparatus.

The main objects of the invention are, to provide a neat, compact, efficient, and durable machine for churning butter, which is also adapted to coöperate with a working apparatus to work the butter when the churning has been completed.

The cylindrical body 1 of the churn is mounted on roller bearings in a base frame 2, at its front end, and has its back end rotatably mounted on a stub shaft 3 rotatably mounted in the back of frame 2. Shaft 3 is rotatably mounted through the center of a circular plate 4 secured to the center of the back of the churn body 1, and has its inner end 5 squared and tapered, for a purpose to be later disclosed. A bevel gear 6 is keyed on the outer end of shaft 3 in mesh with a second bevel gear 7 keyed on the inner end of shaft 8 adapted to be rotated by pinion 9 keyed thereon; with which a gear 10, feathered on the drive shaft 11, is adapted to be brought into mesh. Gear 10 is integral with a clutch member operated by a lever 12 the other end of which carries a clutch member feathered on shaft 8. Beyond gear 10 a gear 13, integral with the drive wheel of a fast and loose pulley 14, is rotatably mounted about the outer end of shaft 11. This gear 13 is provided with an integral clutch member adapted to receive the clutch member on shaft 11 carried by lever 12, and is in mesh with an idler gear 15 mounted on shaft 8. A tapered gear 16 is keyed on the inner end of shaft 11, in mesh with a rack ring 17 secured on the back of churn body 1 concentric with plate 4. When lever 12 is in the position shown in Fig. 3, the clutch member of gear 10 is in clutch with the member of gear 13 so that gear 10, and consequently shaft 11 and tapered gear 16, are rotated at the same speed as the pulley 14, which rotates the churn body 1. If the lever 12 be reversed, gear 10 will be brought into mesh with gear 9 and clutch member 18 on shaft 8 will be brought into clutch with the member of idler 15. This will result in shaft 8 being rotated directly from the pulley 14 and shaft 11 will be driven through gear 9 at a greatly reduced speed. By this means, stub shaft 3 will be rotated through bevel gears 7 and 6, and the body 1 of the churn will be rotated at a greatly reduced speed.

The front of the churn is closed by a centrally located removable circular door 19 inside of and concentric with a flanged bearing ring 20 which rests on the bearing rollers 21, provided with suitable securing means. Around the inside of body 1 there are secured a number of radially disposed equally spaced shelves or blades 22 of any suitable material.

A working apparatus is used in conjunction with the churn. This apparatus consists of a wheel mounted frame 23 which carries a table provided with an open V trough and a rotatable ribbed roller 24 centrally located beneath the trough and extending the full length thereof. A gear provided with a central square bore 25 adapted to receive the inner end 5 of stub shaft 3 is rotatably mounted on the end of frame 23 in mesh with a second gear keyed on the shaft of roller 24. The stand 23, and the table carried thereby are so spaced that, when the churn is opened, the table will fit in the center of the churn and the stand base will fit beneath the churn body so that, when the table is inserted completely into the churn body, the inner end of the stub shaft 3 will fit snugly into the bore of the gear in mesh with the gear keyed on the shaft of roller 24. The table is, of course, slightly narrower than the opening in the front of the churn body so as to be easily insertible therein. A semicircular guard 26, of somewhat larger diameter than the door of the churn, is secured to the table and fits snugly against the front of the churn, when the table is in use, so as to exclude dust and all other foreign matter and also prevents spilling or splashing out of the contents of the churn.

The operation is as follows: The cream is put into the churn which is rotated until butter is formed. During this operation lever 12 and the elements controlled thereby are in the position shown in Fig. 3. As soon as the butter is properly formed, the churn is stopped and the buttermilk is drained off through a suitable drain at the back of the churn body 1. The door 19 is then removed and the working apparatus is rolled into position so that table and roller 24 are inside of the body of the churn, and the inner end 5 of stub shaft 3 is in socket 25 of the gear in mesh with the gear keyed on the shaft of roller 24. When the working apparatus is in position, lever 12 is thrown over so as to lock clutch member 18 to gear 15 and bring gear 10 into mesh with gear 9, and the driving belt is then drawn over on to the driving portion of pulley 14. This causes the churn body 1 to be rotated at a reduced speed, as previously described, and also rotates working roller 24 by means of stub shaft 3. As the churn body 1 rotates, the butter drops from the shelves 22 located therein on to the roller 24 so as to be worked thereby, and falls through the trough into the lower part of the churn body. This operation continues until the butter has been thoroughly worked, when it is removed from the churn and packed.

The body 1 is provided with a window 30, in the back end, for observation purposes.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In a combined churn and butter worker, a rotary churn body, in combination with a shaft arranged centrally with respect to said body rotatable within said body and adapted to engage and drive butter-working means with its inner end, gearing for driving said shaft and a trough provided with butter-working means and gearing to actuate the same, said trough, butter-working means and gearing being movable into said body, for said gearing to engage said shaft and be driven thereby.

2. In a combined churn and butter-worker, a rotary churn body, in combination with a centrally arranged shaft rotatable within said body and actuating gearing for the latter, and a butter-working trough and roller readily insertible into said body, for said gearing to engage said shaft and be driven thereby to rotate said roller, as said trough and roller receive the butter from the churn.

3. In a combined churn and butter-worker, a rotary churn body provided with an opening, a door for the same and a circular gear-rack, in combination with a centrally arranged shaft adapted to drive a butter-working roller on its inner end within said body and provided externally thereto with a gear-wheel, a frame readily insertible into said body through said opening and carrying a butter-working trough and roller to receive the butter and actuating gearing for said roller, said gearing being adapted and arranged to be engaged and rotated by said shaft when said trough, roller and gearing are thus inserted, and gearing external to the churn body provided with clutches and shifting devices whereby at will either the churn body may be driven for churning without driving said shaft or the latter may be driven for butter working and the churn also driven at a reduced rate of speed.

4. In a combined churn and butter-worker, a rotary churn body, in combination with a shaft rotatable within said body and a trough and butter-working means adapted to be moved into said body and into proximity to said shaft, said butter-working means being adapted to be engaged and driven by said shaft when thus inserted.

In witness whereof I have hereunto set my hand in the presence of two witnesses.

JOSEPH ERNEST GAGNON.

Witnesses:
  JOSEPH DAMIEN LERRÉ,
  CHARLES ARTHUR BEAUDETTE.

Copies of this patent may be obtained for five cents each, by addressing the "Commissioner of Patents, Washington, D. C."